June 5, 1973     J. M. SMITH     3,737,365
METHOD OF MAKING COMPOSITE INLAY DESIGNS PRODUCTS
Original Filed Dec. 2, 1968     4 Sheets-Sheet 1
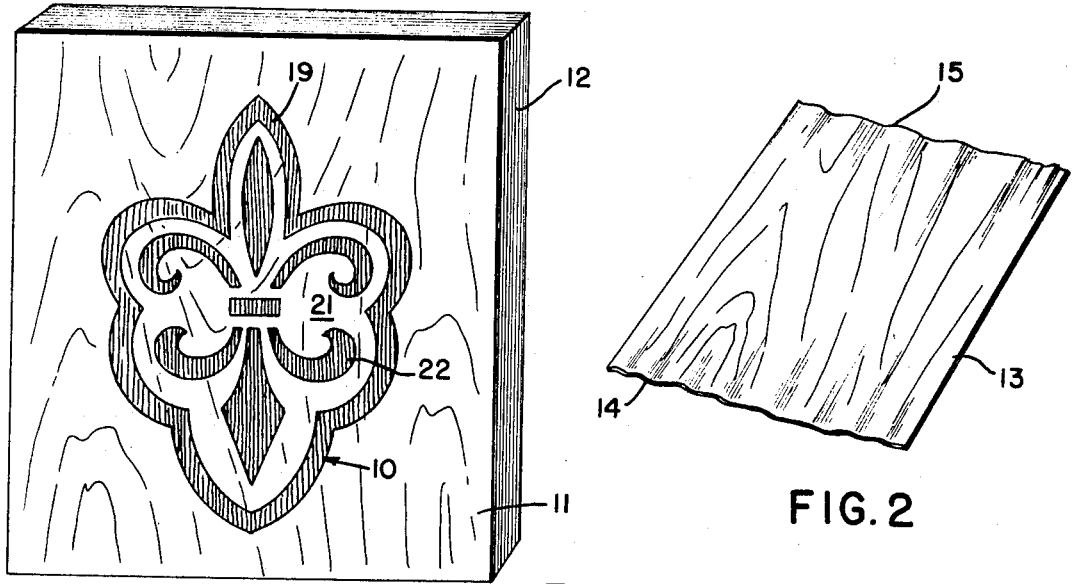
FIG. 1
FIG. 2
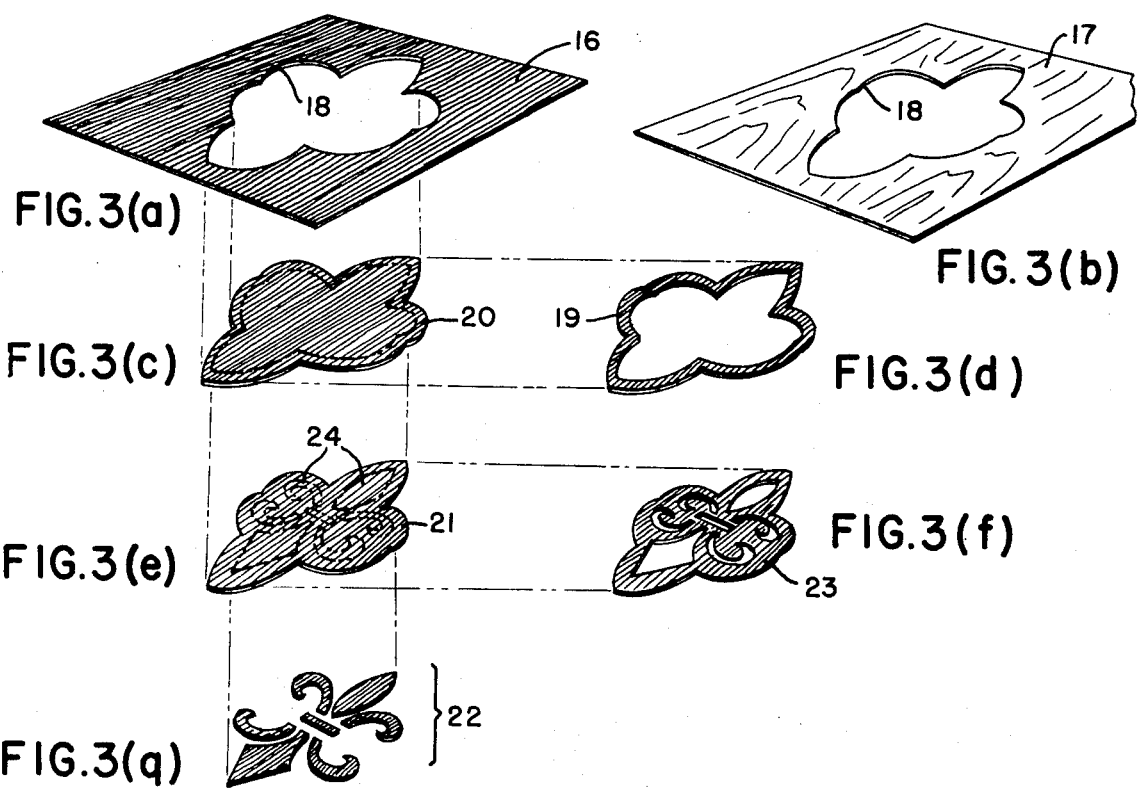
FIG. 3(a)   FIG. 3(b)   FIG. 3(c)   FIG. 3(d)   FIG. 3(e)   FIG. 3(f)   FIG. 3(q)
INVENTOR.
JOE M. SMITH
BY
David Rabin
attorney INVENTOR.
JOE M. SMITH
BY
David Rabin
attorney June 5, 1973   J. M. SMITH   3,737,365
METHOD OF MAKING COMPOSITE INLAY DESIGNS PRODUCTS
Original Filed Dec. 2, 1968   4 Sheets-Sheet 3

INVENTOR.
JOE M. SMITH
BY
*David Rabin*
attorney

June 5, 1973   J. M. SMITH   3,737,365
METHOD OF MAKING COMPOSITE INLAY DESIGNS PRODUCTS
Original Filed Dec. 2, 1968                4 Sheets-Sheet 4

INVENTOR.
JOE M. SMITH

BY

*David Rabin*
attorney

United States Patent Office 3,737,365
Patented June 5, 1973

---

3,737,365
METHOD OF MAKING COMPOSITE INLAY DESIGNS AND PRODUCTS
Joe M. Smith, High Point, N.C., assignor of a fractional part interest to Joseph P. Rawley, High Point, N.C.
Continuation of abandoned application Ser. No. 780,333, Dec. 2, 1968. This application Mar. 15, 1971, Ser. No. 124,446
Int. Cl. B29c 17/00; B32b 1/04, 31/00
U.S. Cl. 161—41                9 Claims

ABSTRACT OF THE DISCLOSURE

A method of making composite inlaid designs in plane sheet form with individual discrete members and the product formed thereby in which sheets of different materials having a predetermined composite design are cut with selected individual discrete members of the design being selectively removed from a sheet of material of one type and replaced by individual discrete members from a sheet material of another kind to form an inlaid pattern from different materials while subjecting the sheet material and the replaced discrete members to a suction to retain the sheet material and discrete members in situ after which a removable sheet may be applied adhesively to retain the composite design together in sheet form.

BACKGROUND AND OBJECTIVES OF INVENTION

This application is a continuation of Ser. No. 780,333, now abandoned.

Inlaid patterns made of wood applied to various pieces of furniture are extremely costly to make and require highly skilled craftsmen in order to design and execute the design by utilizing an artistic ability for placing individual pieces of wood into carved-out partions of the receiving surface. The more intricate the design, the more costly and time-consuming will be the resulting product. Not only must the receiving surface be carved intricately to receive the discrete design portions of different materials so as to provide an attractive inlay surface but the individual replacement discrete members must be carved individually in order to fit the receiving surface carved-out portion and the depth of cut must be uniform and the degree of exactitude for the replacement discrete members may be extremely difficult particularly where intricate designs are desired.

The high cost of labor for producing inlaid designs makes it prohibitive for use in conjunction with moderately priced furniture. Some attempts have been made to form designs in thin wood sections referred to in the plywood industry as "flitches," however, the non-uniformity of the flitches and the corrugations inherent in such thin sections have made it impractical, under presently known systems, to use presently available methods to achieve any degree of acceptability for high quality inlay pattern work. The handling of the composite designs has not proven satisfactory and the inlay mating relationship of individual discrete members of the composite pattern has not been satisfactory, although the cost has been quite high to achieve the present status of development in the manufacture of inlay patterns for table tops and other furniture articles.

Intricate inlaid composite designs made of individual discrete members in accordance with this invention provides retention of the integrity of the composite pattern and of the discrete individual members made of different materials which will maximize interchangeability without sacrificing quality and there is maintained a higher degree of design capabilities. Preferably, wood flitches are utilized of the same thickness, and regardless of the cross-section sinuous configuration, the flitches may be cut to provide the desired design for the receiving surface and other different wood types may be used for complementary inlay discrete members for assembling a composite contrasting color and wood design.

The method of forming the intricate inlaid composite designs of this concept enable intricate designs to be manufactured at one source by relatively unskilled labor and the composite inlaid designs assembled for shipment to a furniture manufacturer at a remote location to be mounted on an article of furniture for ultimate finishing without disturbing to composite assembled design which may be made of numerous individuad discreet design members.

The present invention further contemplates the accurate die cutting of the parent sheet to remove individual discrete members of the composite design to be replaced with discrete individual members identical in contour from another contrasting color material. The parent sheet from which discrete portions have been removed and other contrasting members have been replaced will be subjected to a suction in order to present the parent sheet in plane form thereby facilitating the introduction and retention of the individual replacement discrete members into the cut-out portions of the design in the parent sheet thereby maintaining the integrity of the newly formed composite sheet in plane sheet form after which tapes or a sheet may be adhered to secure the individual discrete members and the parent sheet together prior to lamination of the sheet to a supporting base.

BRIEF DESCRIPTION OF INVENTION

The method of this invention and the product formed thereby is directed to the formation of intricate inlaid composite designs made from thin sheet material, preferably wood, in which individual sheest of different materials of contrasting colors are cut to a predetermined composite design made of individual discrete contoured members. The parent or base sheet from which the individual discrete members may be removed selectively will be retained to form the receiving sheet for assembling individual discrete members of other materials that have been removed from other sheets having the same design contour to be replaced into the host or parent sheet to make up the composite inlaid design. The parent or host sheet from which the individual design portions have been removed will be subjected to a suction for positioning the sheet in plane form while replacing removed portions therefrom with individual discrete members cut and removed from other sheets of contrasting material to maintain the composite design in plane form during assembly. The parent sheet with the individual discrete members are then secured together while being subjected to suction by suitable adhesive means preliminary to applying the composite inlaid design to a supporting base to which the composite inlaid design may be laminated before final finishing operations. When suitably adhered to a base supporting structure, the composite design may be finished as by sanding with the attendant removal of any securing materials before applying the desired finishes.

BRIEF DESCRIPTION OF DRAWINGS OF A PREFERRED EMBODIMENT OF THE METHOD AND ARTICLE

There is illustrated in the accompanying drawings a preferred embodiment of the method and article of this invention in which drawings like characters of reference designate corresponding parts throughout the several views, and wherein:

FIG. 1 is an assembled and mounted panel illustrating a completed composite design utilizing the method and the article of this invention;

FIG. 2 is a perspective view of a thin sheet of wood or flitch from which the parent sheet and individual discrete design members may be formed;

Figure 4A:
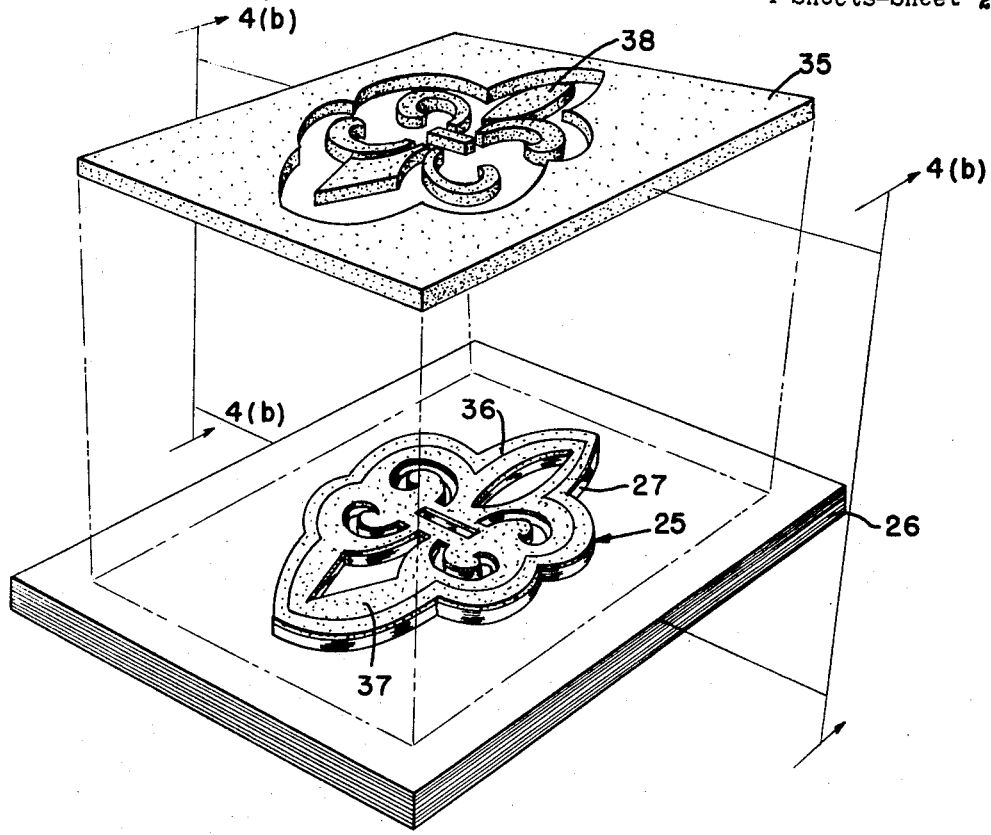
Figure 4B:
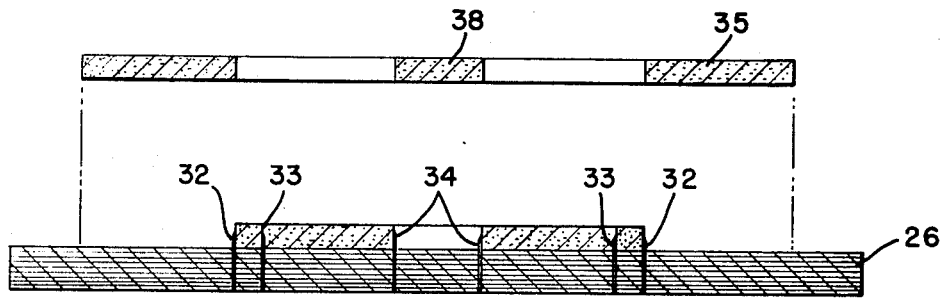
Figure 5A:
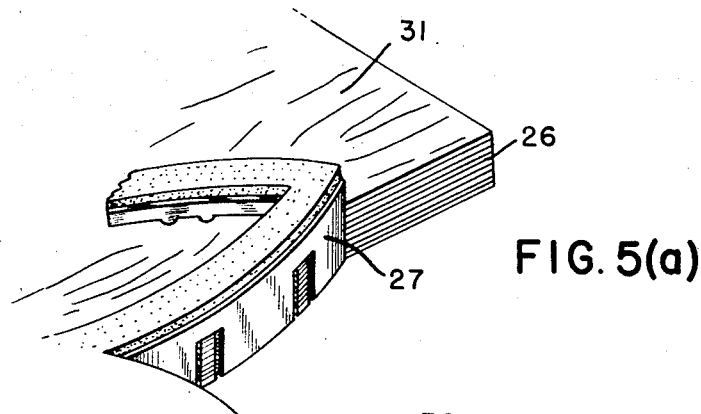
Figure 5B:
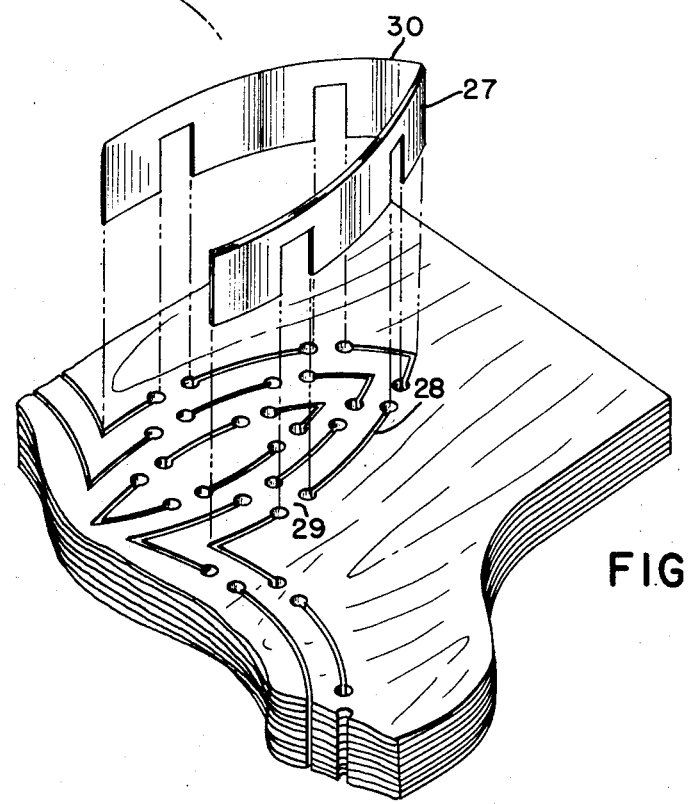
Figure 6:
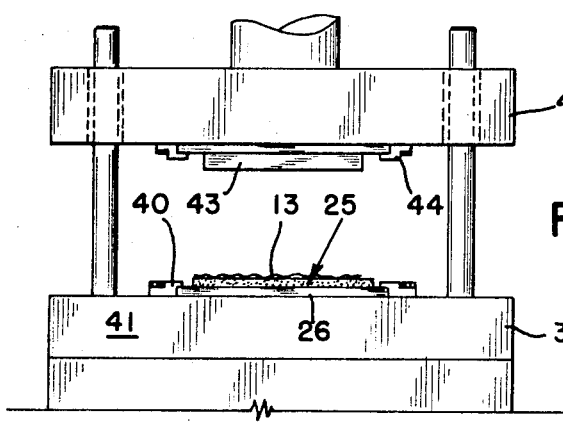
Figure 7A:
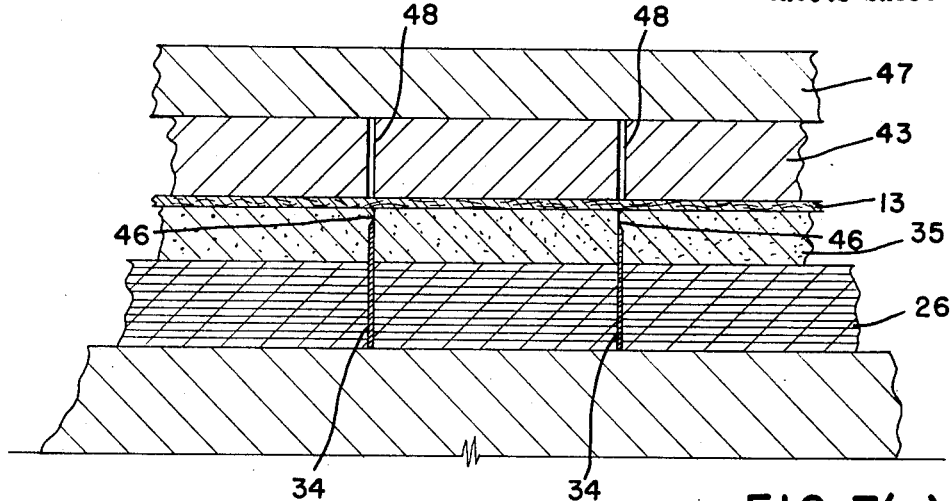
Figure 8:
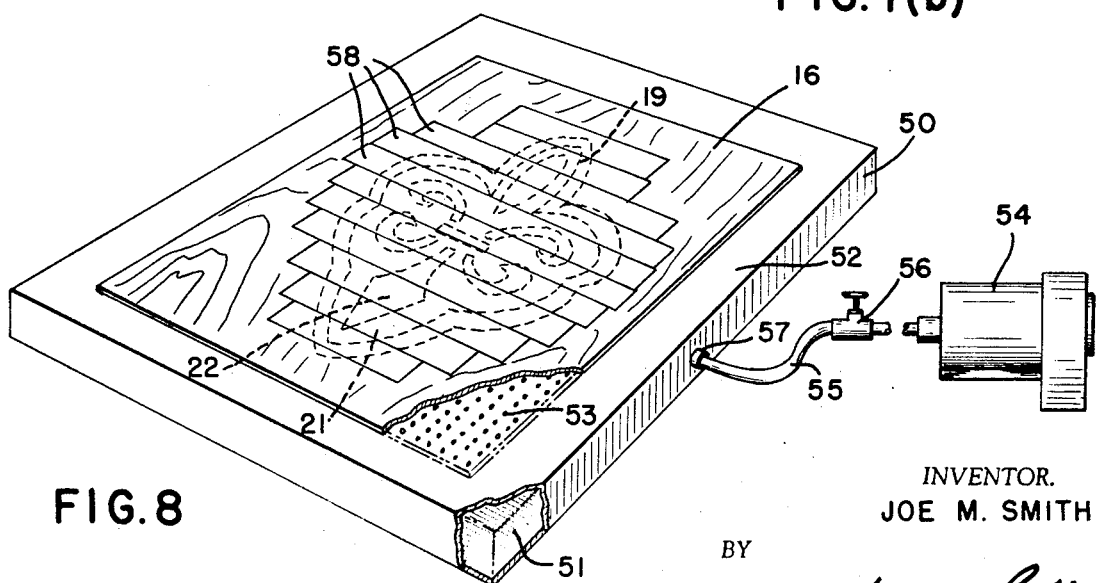

FIGS. 3(a) through (f) are individual perspective views in sequence of the various patterns and portions thereof formed in flitches or thin sheets of wood of different materials and color to achieve the desired contrasting combination;

FIG. 4(a) is an exploded perspective view of a Steel rule die plate incorporating the configuration of one composite design illustrating the various components from which the design of FIG. 1 may be formed;

FIG. 4(b) is a transverse sectional view taken substantially along the plane of section line 4(b)—4(b) of FIG. 4(a);

FIGS. 5(a) and (b) are partial perspective and exploded views, respectively, of portions of a Steel rule die construction as shown in FIGS. (a) and (b);

FIG. 6 is a front partial elevational view of a hydraulic press in which the Steel rule die is positioned with a flitch supported on the die to be cut;

FIGS. 7(a) and (b) are enlarged partial transverse sectional views of a flitch mounted in a press on a die preliminary to cutting therethrough, and subsequent to cutting, respectively; and FIG. 8 is a partial perspective and schematic illustration of a suction table on which the composite patterns are formed, maintained and secured to the parent or host sheet.

DETAILED DESCRIPTION OF THE INVENTION

Referring to the drawings and particularly to FIG. 1, there is shown, for purposes of illustration only without any intended limitation on the design configuration, a composite pattern 10 made up of numerous inlaid pieces of individual discrete members supported in a single plane in sheet 11 that is laminated or otherwise secured to the supporting base structure 12 which may be a table top, dresser top, drawer front, wall panel, or other supporting structure on which a design of inlaid character may be desired. The plane sheet 11 may be of any size capable of being handled and may be referred to hereinafter as the parent or host sheet in which the composite design may be formed. The sheet 11 is preferably made of wood and is received in relatively thin slices, the thickness of which may vary considerably depending upon the end use, but very satisfactory designs have been made in wood flitches of approximately 0.050". A rectangular flitch 13 is shown in FIG. 2 as it is normally received and the end sections 14 and 15 portray the wavy or irregularity of the sinuous cross-section characteristic of relatively thin flitches of the type used to form plywood laminations. However, it will be readily apparent that the thicknesses of the flitches or more solid woods may be employed depending upon the final applications to which the designs may be adhered. In the formulation of the composite design 10 parent or host sheets 16 and 17 may be used with each of the sheets being of wood but of different types of wood. For example, sheet 16 may be desired to be of light oak for a light background and sheet 17 may be walnut or other dark wood as a background for another design. The desired outer design perimeter 18 in each of the sheets 16 and 17 will be cut, as will be described hereafter, in order to form the outline of the design for receiving the internal inlay components of the different selected color combinations. For example, in FIG. 1, the continuous dark border 19 is removed from sheet 17 for transposition into the sheet 16 within the perimeter 18 thereof and the comparable pattern 20 in sheet 16 may be transposed into sheet 17 to form a light border in the composite design. Similarly, the light background interior section 21 in FIG. 3(e) may be positioned contiguous to the inlay portion 19 from sheet 16 in order to have a color contrast with the inlay discrete member 19 and to match the background of panel or sheet 16. Finally, the individual design discrete members collectively referred to as 22 in FIG. 3(g) removed from the internal dark sheet section 23 in FIG. 3(f) may be positioned in the recesses 24 provided in the discrete pattern member 21 in order to complete the composite inlaid pattern. The assemblage of the various components will be described hereafter.

It has been found desirable to utilize a Steel rule die in order to form clean and sharply cut patterns of the individual discrete members and in FIGS. 4(a) and (b) and FIGS. 5(a) and (b), there is illustrated a Steel rule die 25 supported on the plywood base 26 with the contoured Steel rule die 27, in sections being secured to the base 26 through Steel rule receiving grooves 28 therein with spaced-apart integral sections 29 for maintaining the Steel rule in shape. The upper cutting edge 30 of the Steel rule is spaced vertically above the top surface 31 of the support panel 26 sufficiently to receive a flitch of the desired thickness to be cut. The various individual sections of the Steel rule die are shown in FIG. 4(b) wherein the outer cutting die 32 will provide the cut for the perimeter 18 shown in sheets 16 and 17 while the Steel rule die blade 33 will provide the contour for the pattern sections 19 and 20 shown in FIGS. 3(c) and 3(d). The two innermost blades of the Steel rule 34 will provide the inner discrete members or portions thereof collectively referenced 22 although other portions of the blade will accomplish these designs displaced from the section line 4(b)—4(b). A highly dense resilient pad of rubber or other elastomeric material 35 surrounds the various portions of the Steel rule die 27 with each of the individual sections 36, 37 and 38 having a corresponding configuration to the individual discrete members 19, 21 and 22.

Figure 7B:
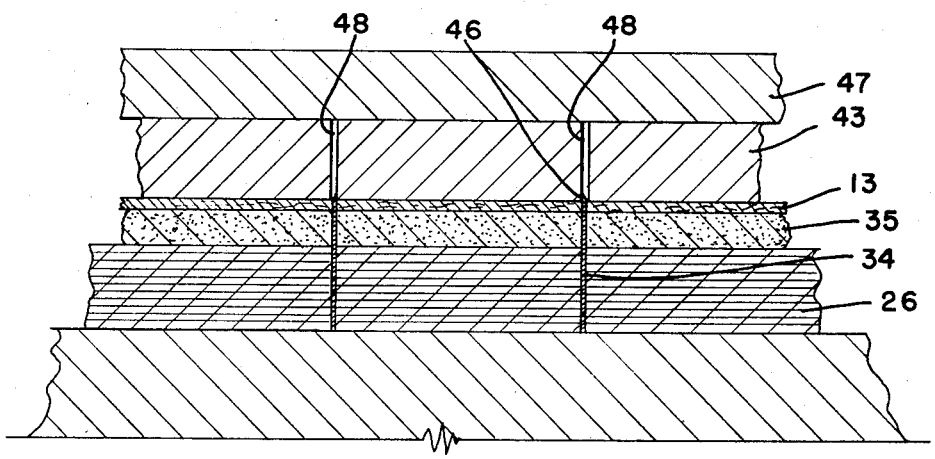

The Steel rule die 25 supported on the panel base 26 in the assembled condition is mounted in a hydraulic press 39 and releasably secured by the locking lugs 40 to the bed plate 41 of the press with a flitch 13 positioned on the die 25 preliminary to actuation of the press. The press head 42, when actuated, will displace the die cooperating plate 43 which is secured to the head 42 by means of the locking lugs 44 to engage flitch 13 to flatten it initially into a single plane and then progressively apply additional force to compress the resilient sections 35, 36, 37 and 38 to expose the cutting edges of the Steel rule die blades which will cut the designs in flitch 13 and form the individual discrete members 22 and the other patterns in the flitch 13 to resemble that shown in FIGS. 3(a) through 3(g), recognizing, however, that but a single flitch is being cut at a time. It is contemplated that the several flitches may be cut simultaneously, if desirable. The progression of the cutting action of the Steel rule die is shown in FIGS. 7(a) and 7(b) wherein the Steel rule die blades 34 are shown with the cutting edges 46 about to engage the flat planar flitch 13 which has been arranged in this condition by the preferably resilient plate 43 securely fastened to the plate support panel 47 mounted to the press head 42 with blade-receiving recesses 48 being provided in plate 43 to receive the Steel rule die blades 34, at least partially, as further pressure is applied to the press head in order to form the discrete individual members of the pattern in sheet or flitch 13, as shown in FIG. 7(b). The resilient sections 35 through 38 are shown partially compressed to expose the cutting blade portions 46 of the Steel rule die. After completion of the cutting operation, pressure on the press head 42 is released, and the head 42 is elevated permitting the removal of the flitch 13 with all of the individual discrete pattern members which may remain in position or may become displaced depending upon the extent of the pattern and the extent to which the flitch with the cut portions may remain in a flat planar condition. However, usually the flitch will tend to return to an irregular condition as shown in FIGS. 2 and 6 depending upon the moisture content retained in the flitch. The individual discrete pattern members may become dislodged when removed from the press and they are gathered together by the operator for re-assembly thereafter into composite designs in parent or host sheets.

When the individual flitches 13 have been subjected to the cutting action of the Steel rule die 25, the flitches with the cut individual discrete members 19, 21 and 22, are removed from the press and the individual discrete members may be separated into individual compartments according to the individual design and color for selection by an operator for re-assembly into a parent or host sheet 16 or 17.

A table 50 which may be suitably supported on legs is provided with a hollow interior 51 with the upper frame 52 being provided with a foraminous surface 53 through which surface air may flow when the surface is unobstructed when the table 50 is subjected to a vacuum or suction generated by the suction motor and pump assembly 54 that is connected by the line 55 through the valve 56 to the fitting 57 secured to the table frame 52. A parent or host sheet 16 is placed on the foraminous surface 53 and maintained in situ with the deflections in the flitch becoming minimal due to the suction so as to maintain the sheet 16 in planar condition on the plane foraminous surface 53. The host sheet 16 has had removed from it all or substantially all of the discrete design members and is prepared to receive the individual discrete members 19, 21 and 22 in whatever color combination is desired depending upon the color combinations of the woods or other sheet material that may be available to blend or contrast with the host sheet. The individual discrete members are positioned in place as in a jig-saw puzzle depending upon the desired color combinations, and the individual discrete members are retained in situ by virtue of the induced suction applied to the table 50 which will be adequate to flatten the discrete member into the openings provided by the design.

When the composite inlay design has been completed with all of the discrete members positioned in the host sheet 16, paper gum tape strips 58 are adhered across the pattern discrete members and host sheet to retain the composite design in position for subsequent application to a supporting structure such as the panel 12 shown in FIG. 1. Upon completion of the composite design and adhesion of the tapes 58 or other suitable securing means which may include a unitary sheet or other adhesive means, the valve 56 may be closed permitting the removal of the parent or host sheet 16 and the retained individual discrete members of the design therein.

The sheet 16 may then be placed on a table surface or other surface for lamination thereon in a conventional manner. Thereafter, the exposed surface as shown in FIG. 8 with the tapes 58 thereon may be sanded to provide a smooth surface which will remove the tapes. Thereafter, suitable fillers, sealers and finishes may be applied to the parent sheet 16 and to the individual discrete design members to achieve the desired contrasting coloration in the design.

It has been found convenient to stack the completed composite design sheets either vertically or horizontally for shipment and storage without destroying the integrity of the completed design. Deflections in the sheet 16 do not destroy the close mating relationship of the individual discrete members in the design.

For the purpose of this disclosure, the sheet material and the individual discrete members will be in the form of relatively thin wood construction.

I claim:

1. A method of forming intricate inlaid composite designs with individual discrete members in the same planar sheet comprising the steps of: flattening a first sheet of thin material having an non-uniform, wavy cross-section into a single plane by applying forces to opposite faces of the thin material to clamp the material, die-cutting from the first sheet of material a predetermined composite design comprised of individual discrete members by displacing said sheet of material relative to cutting blades, flattening a second sheet of thin, contrasting material having a non-uniform, wavy cross-section into a single plane, die-cutting from the second sheet of contrasting material a predetermined composite design composed of individual discrete members identical in size and contour to the discrete members cut from the first sheet of material, removing selected individual discrete members from the first and second sheets to form openings in the sheets while permitting said first and second sheets and said discrete members to return to their wavy, non-uniform cross-sectional configuration, subjecting the first sheet and the openings therein to suction to flatten and maintain the sheet planar and in situ, and positioning, flattening and retaining in a prescribed manner selected individual discrete members from said first and second sheets in the openings of corresponding size and shape provided in said first sheet to form a composite contrasting design.

2. A method of forming intricate inlaid composite designs with individual discrete members in the same planar sheet as claimed in claim 1, and applying a surface to retain all of the individual discrete members in the composite design in situ.

3. A method of forming intricate inlaid composite designs with individual discrete members in the same planar sheet as claimed in claim 1, and securing said discrete members and the first sheet together to prevent removal accidentally of the discrete member from the composite design.

4. A method of forming intricate inlaid composite designs with individual discrete members in the same planar sheet as claimed in claim 1, and adhesively securing tape to secure the discrete individual members to the sheet material while subjecting the sheet material and the discrete members to suction.

5. A method of forming intricate inlaid composite designs with individual discrete members in the same planar sheet as claimed in claim 1, and applying an adhesive tape to retain all the discrete pieces to the first sheet while subjecting the sheet and discrete pieces to suction, and removing the composite assembled design sheet after discontinuing the applied suction thereto.

6. A method of forming intricate inlaid composite designs with individual discrete members in the same planar sheet as claimed in claim 1, and laminating the composite sheet and design to a supporting surface.

7. A method of forming intricate inlaid composite designs with individual discrete members in the same planar sheet as claimed in claim 6, and surfacing the exposed side of said sheet and composite design to provide a smooth surface, and finishing the smooth surface with finishing materials.

8. A composite inlaid design made in accordance with the process of claim 1.

9. A composite inlaid design made in accordance with the process of claim 2.

References Cited

UNITED STATES PATENTS

| | | | |
|---|---|---|---|
| 1,889,733 | 11/1932 | Unger | 156—285 |
| 2,751,946 | 6/1956 | Grumelspacher | 52—313 |
| 3,212,542 | 10/1965 | Miller et al. | 144—328 |
| 3,297,507 | 1/1967 | Twomey et al. | 156—249 |
| 3,453,761 | 7/1969 | Giesecke | 156—285 |

FOREIGN PATENTS

| | | | |
|---|---|---|---|
| 1,104,669 | 2/1968 | Great Britain | 144—309 |

DOUGLAS J. DRUMMOND, Primary Examiner

U.S. Cl. X.R.

156—264, 285